3,166,573
2-(NITRATOALKYL)-1,4-BENZODIOXANES

Jerry E. Robertson, St. Paul, Minn., assignor to Colgate-Palmolive Company, a corporation of Delaware
No Drawing. Filed Nov. 8, 1963, Ser. No. 322,512
4 Claims. (Cl. 260—340.3)

This invention relates to organic nitrates having pharmacological activity.

According to the present invention there are provided novel 2-(nitratoalkyl)-1,4-benzodioxanes of the formula

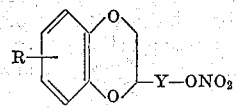

wherein Y is a lower alkylene such as the groups having 1 to 5 carbon atoms including methylene, ethylene, propylene, isopropylene and butylene and R is hydrogen, a halogen such as chlorine and bromine and trifluoromethyl.

The 2-(nitratoalkyl)-1,4-benzodioxanes can be readily produced by reacting a 2-(chloroformyloxylalkyl)-1,4-benzodioxane with an inorganic nitrate and advisably silver nitrate. This process may be represented as follows:

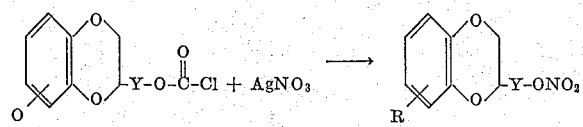

wherein Y and R have the significance previously assigned.

Some of the 2-(chloroformyloxyalkyl)-1,4-benzodioxanes which can be used as starting materials are 2-(chloroformyloxymethyl)-1,4-benzodioxane,
2-[2-(chloroformyloxy)-ethyl]-1,4-benzodioxane,
2-[3-(chloroformyloxy)-propyl]-1,4-benzodioxane,
2-[2-(chloroformyloxy)-propyl]-1,4-benzodioxane,
2-(chloroformyloxymethyl)-6-chloro-1,4-benzodioxane,
2-[1-(chloroformyloxy)-ethyl]-7-bromo-1,4-benzodioxane and
2-(chloroformyloxymethyl)-7-trifluoromethyl-1,4-benzodioxane.

The 2-(chloroformyloxyalkyl)-1,4-benzodioxanes are produced by reacting the corresponding 1,4-benzodiox-2-ylalkanol with an excess of phosgene at a temperature preferably below room temperature and in an inert (non-hydroxylic) liquid reaction medium such as ether, benzene, hexane and chloroform for several hours. A working example is presented to illustrate this reaction.

Reaction between the 2-(chloroformyloxyalkyl)-1,4-benzodioxanes and an inorganic nitrate is readily achieved by combining the reactants at room temperature, or below, in a suitable inert liquid reaction medium which will not react with the acyl chloride. Acetonitrile is particularly suitable since it dissolves silver nitrate, the preferred nitrate reactant. The reactants are advisably employed in a 1:1 molar ratio. The reaction time is not critical but to insure complete reaction at least a few hours is employed. After the reaction is terminated the desired product can be recovered by conventional procedures.

Representative of the products which are produced as described are 2-(nitratomethyl)-1,4-benzodioxane,
2-(2-nitratoethyl)-1,4-benzodioxane,
2-(3-nitratopropyl)-1,4-benzodioxane,
2-(nitratomethyl)-6-chloro-1,4-benzodioxane and
2-(1-nitratoethyl)-7-trifluoromethyl-1,4-benzodioxane.

The 2-(nitratoalkyl)-1,4-benzodioxanes exhibit vasodilator and hypotensive activity in animals and as such are useful in the treatment of hypertenison, in the alleviation of acute angina pain, in the prophylactic treatment thereof, and in the treatment of other peripheral vascular diseases. The compounds are also useful pharmacological tools in studying other vasodilators since they can be used as standards.

The compounds can be administered to animals including humans as pure compounds. It is advisable, however, to first combine one or more of the novel compounds with a suitable pharmaceutical carrier to attain a more satisfactory size to dosage relationship.

Pharmaceutical carriers which are liquid or solid can be used. The preferred liquid carrier is water. Flavoring materials can be included in the solutions as desired.

Solid pharmaceutical carriers such as starch, sugar, talc and the like may be used to form powders. The powders can be used as such for direct administration to a patient or, instead, the powders can be added to suitable foods and liquids, including water, to facilitate administration.

The powders can also be used to make tablets, or to fill gelatin capsules. Suitable lubricants like magnesium stearate, binders such as gelatin, and disintegrating agents like sodium carbonate in combination with citric acid can be used to form tablets.

Unit dosage forms such as tablets and capsules can contain any suitable predetermined amount of one or more of the active agents and may be administered one or more at a time at intervals. Such unit dosage forms, however, should generally contain a concentration of 1.0% to 50.0% by weight of one or more of the active compounds provided by this invention. In general, such unit dosage forms can contain about 5 to 300 mgm. of active agent.

The oral route is preferred for administering the active agents of this invention.

The following examples are presented to illustrate this invention.

EXAMPLE 1
*2-(chloroformyloxymethyl)-1,4-benzodioxane*

To about 60 ml. of condensed phosgene under nitrogen at about −20° C. is added a slurry of 100 g. (0.60 mole) of 1,4-benzodiox-2-ylcarbinol in 100 ml. of dry ether over 15 minutes with stirring. After stirring three hours at less than −10° C. and overnight at room temperature, nitrogen is bubbled through the tan solution for one hour with gentle warming. The volume is adjusted to 300 ml. with ether and the solution is washed with 200 ml. of cold water. The organic layer is separated, dried with sodium sulfate and reduced to a syrup in vacuo. The residue is fractionated to afford 117.9 g. (86%) of product, B.P. 103–115° C./0.10 mm.

EXAMPLE 2
*2-(nitratomethyl)-1,4-benzodioxane*

To a solution of 8.5 g. (0.05 mole) of silver nitrate in 50 ml. of acetonitrile is added 11.4 g. (0.050 mole) of 2-(chloroformyloxymethyl)-1,4-benzodioxane. After the mixture is stirred for 16 hours at room temperature, the precipitated silver chloride is collected by filtration. The filtrate is dried over sodium sulfate and then concentrated under vacuum to a syrup which crystallizes on cooling to give 6.5 g. (62%) of crude product, which product contains about 79% of the active ingredient. Analysis calculated for pure product: C, 51.2; H, 4.3; N, 6.6. Found for crude product: C, 54.1; H, 4.7; N. 5.2.

Various changes and modifications of the invention can be made and, to the extent that such variations incorporate the spirit of this invention, they are intended to be included within the scope of the appended claims.

What is claimed is:
1. A compound of the formula

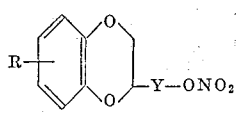

wherein R is a member of the group consisting of hydrogen, chlorine, bromine and trifluoromethyl and Y is a member of the group consisting of straight chain alkylenes and branched chain alkylenes containing from one to five carbon atoms.

2. A compound of the formula

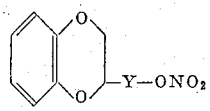

wherein Y is a member of the group consisting of straight chain alkylenes and branched chain alkylenes containing from one to five carbon atoms.

3. 2-(nitratomethyl)-1,4-benzodioxane.

4. The process which comprises reacting a compound of the formula

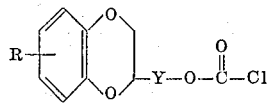

with an inorganic nitrate to produce a compound of the formula

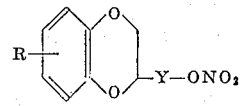

wherein R is a member of the group consisting of hydrogen, chlorine, bromine and trifluoromethyl and Y is a member of the group consisting of straight chain alkylenes and branched chain alkylenes containing from one to five carbon atoms.

References Cited in the file of this patent
UNITED STATES PATENTS

| | | |
|---|---|---|
| 2,887,484 | Funke | May 19, 1959 |
| 2,910,403 | Brendel et al. | Oct. 27, 1959 |
| 3,089,819 | Short | May 14, 1963 |
| 3,101,345 | Schmidt | Aug. 20, 1963 |